Sept. 8, 1964
M. C. NEUMAN ETAL
3,147,983
SHAFT AND PISTON SEAL
Filed June 3, 1960
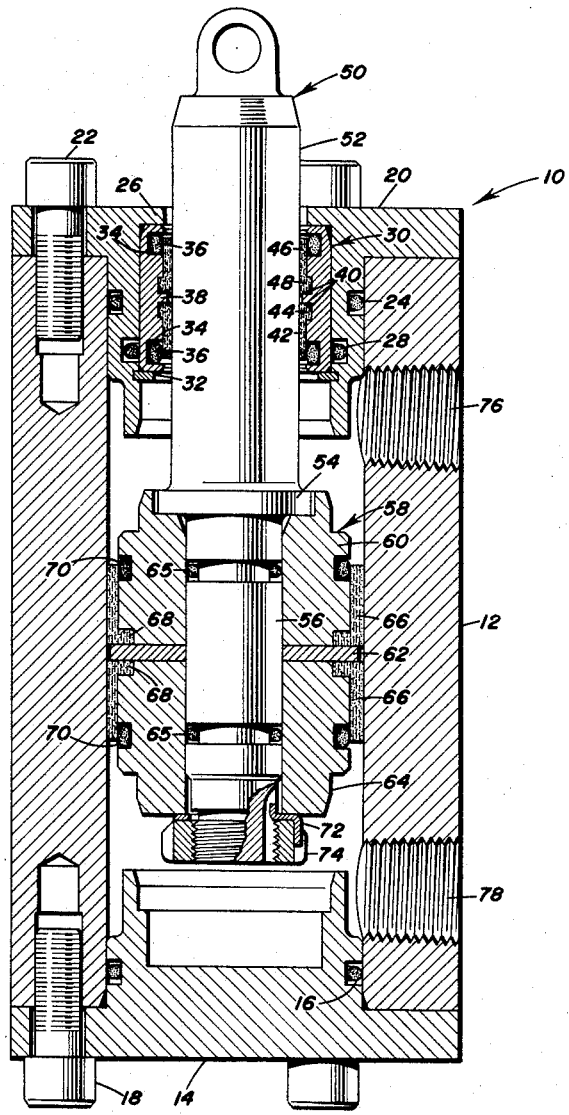
FIG. 1.
FIG. 2.
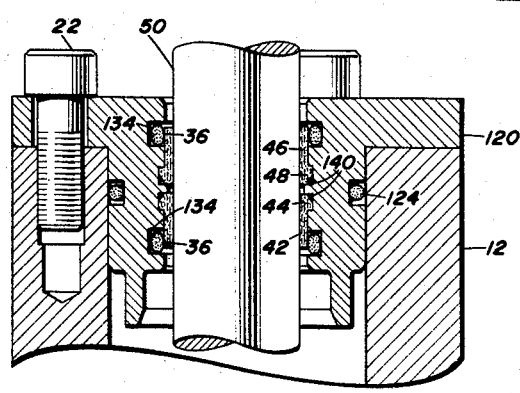
MILTON C. NEUMAN
KENNETH A. RIACH
       INVENTORS
BY Walter G. Finch
       ATTORNEY

United States Patent Office 3,147,983
Patented Sept. 8, 1964

3,147,983
SHAFT AND PISTON SEAL
Milton C. Neuman, Champlin, and Kenneth A. Riach, Minneapolis, Minn., assignors to Northern Ordnance, Incorporated, Fridley, Minn., a corporation of Minnesota
Filed June 3, 1960, Ser. No. 33,786
9 Claims. (Cl. 277—50)

This invention relates generally to shaft glands, and more particularly, the invention pertains to improvements in seal rings for reciprocating pistons and rods.

Seals for rotating or reciprocating shafts are required not only to tightly grip therearound but also to provide a bearing surface. Unfortunately, the choice of a material for the first purpose is not usually the best for the second. Another desirable characteristic for a gland seal is the provision and retention of an abrupt, relatively hard edge for cleaning the moving shaft or adjacent wall free of foreign particles of matter.

It is an object of this invention, therefore, to provide a cartridge type sealing assembly which has good bearing qualities, together with long lasting, tight sealing ability.

Another object of this invention is to provide a self-adjusting pressure seal assembly for relatively moving cylindrical elements, which improves its seal with an increased pressure differential thereacross.

Still another object of this invention is to provide a surface scraper arrangement for the bearing surfaces of cylinders and piston rods.

These and other objects and attendant advantages of this invention will become more readily apparent and understood from the accompanying specification and single sheet of drawings in which:

FIG. 1 is an axial section through a pump or piston assembly incorporating features of this invention; and FIG. 2 is a fragmentary axial section through another preferred embodiment of a rod sealing and wiping arrangement incorporating features of this invention.

Referring now to the details of the drawing of FIG. 1, reference numeral 10 designates generally a pump or piston assembly. The pump or piston assembly 10 consists of a cylinder 12 having a lower cylinder head 14 and an upper cylinder head 20 secured together by means of cap screws 18 and 22, respectively.

The lower cylinder head 14 is sealed with an annular O-ring 16 located between the inner wall of cylinder 12 and the lower cylinder head 14, while the upper cylinder head 20 is sealed with another annular O-ring 24 located between the inner wall of cylinder 12 and the upper cylinder head 20.

The upper cylinder head 20 is bored for loose clearance of a piston rod 50, and it is also counterbored to provide an annular flange 26. A cartridge type seal assembly 30 is sealed within this counterbore with an O-ring 28 which is located between the outer wall of the seal assembly 30 and in a recess in the inner wall of the counterbore of the cylinder head 20. The seal assembly 30 is retained in the counterbore of the upper cylinder head 20 against the flange 26 thereof by means of a snap ring 32 which is received in an annular recess in the wall of the counterbore of the upper cylinder head, as shown in the drawing of FIG. 1.

The seal assembly 30 consists generally of a tubular housing 38 formed preferably of steel or bronze, although any one of a number of metals or plastics would be suitable. A seal 42 and an identical spaced wiper or scraper 46 are diametrically compressed and pushed within the housing 38 until flanges 44 and 48 on the outside diameter of the seal 42 and scraper 46 snap into grooves 40 which are cut into the inner wall of housing 38 for this purpose. The seal 42 as well as the scraper 46 are formed of a semi-resilient material, preferably fibre glass filled polytetrafluoroethylene or pure polytetrafluoroethylene.

The plain non-flanged ends of the seal 42 and the scraper 46 each rest against and compress a spaced O-ring 36 located within a pair of spaced recesses or grooves 34 formed in the inner wall of the housing 38.

Before assembly with the housing 38, the inside diameters of the seal 42 and the scraper 46 are cylindrical. After assembly with the housing 38 and the spaced O-rings 36, the plain ends of seal 42 and scraper become compressed due to the pressure applied by the O-rings 36. Consequently, a scraping action occurs upon the piston rod 50 when an upper end 52 thereof is assembled within the seal assembly 30 to provide very effective retention of the fluid and preventing foreign material from entering the seal.

Due to the fact that the spaced O-rings 36 are initially compressed at assembly of the components, seal 42 and scraper 46 are held in firm contact with the piston rod 50 even in the absence of fluid pressure. With fluid pressure effective against the partially exposed lower O-ring 36, still greater compression occurs therein to improve the seal within its groove 34 and to urge the seal 42 more tightly against the piston rod 50.

A lower end 56 of the piston rod 50 is also provided with a piston assembly 58 which is held against an annular flange 54 formed on the piston rod 50 by means of a locknut 74 and a lockwasher 72 located at the lower end of the rod 50.

The piston assembly 58 is divided into an upper piston half 60, and a lower piston half 64 spaced and separated from each other by a spacer 62.

A pair of spaced annular seals 66 having flanges 68 are retained between the upper and lower halves 60 and 64, respectively, of the piston assembly 58 and the inner cylindrical wall of the cylinder 12 and against the spacer 62.

The unflanged ends of the seals 66 are urged outwardly by spaced compressed O-rings 70, which operate with the same principles as mentioned above for the seal assembly 30 for the piston rod 50, that is, the seal 42 and scraper 46.

A pair of spaced O-rings 65 located in spaced annular recesses or grooves formed in the annular peripheral surface near the end of the rod 50 located adjacent the inner cylindrical surface of the piston assembly 58 prevent fluid leakage between the piston assembly 58 and the lower end 56 of the piston rod 50.

An upper threaded aperture 76 located in the cylinder 12 and a lower threaded aperture 78 located in the cylinder 12 are provided for fluid conduit fittings in the usual manner.

FIG. 2 illustrates a rod sealing and wiping arrangement very much like the arrangement disclosed in FIG. 1, with the exception that the various wiping and sealing elements are separately installed and maintained in a cylinder head 120 rather than being first assembled into a cartridge type seal assembly 30 which is inserted, as a single unit, into the cylinder head. The tubular housing 38 of FIG. 1, is dispensed with, along with its associated snap ring 32 and O-ring 28. In FIG. 2, flanges 44 and 48, of seal 42 and wiper 46, respectively, are received by grooves 140 formed in cylinder head 120. Similarly, spaced grooves 134 are provided, in cylinder head 120, to receive the O-rings 36. An O-ring 124 similar to O-ring 24 is also utilized.

Also it is to be noted that the seal acts as a rod scraper on the pressure side as well as the atmosphere or low pressure side thereof. In addition, the seal element and scraper element function together as a bearing as well as a seal.

Obviously, many modifications and variations of the present invention are possible in light of the above teachings. It is, therefore, to be understood that within the scope of the appended claims the invention may be practiced otherwise than as specifically described.

What is claimed is:

1. In combination, a housing having a wall defining an opening extending therein, a member arranged for movement in said opening, and a sealing assembly located between said movable member and the wall of said opening of said housing for sealing said opening so as to prevent leakage of a medium therethrough upon movement of said member, said assembly consisting of an annular resilient ring positioned in said housing, and an annular semi-resilient elongated shaped seal having a flanged end for locking in said housing and its other end located adjacent and in engagement with said annular ring with the point of pressure from said annular resilient ring being positioned at a point axially remote from said flanged end of said semi-resilient seal, at said other end thereof, said seal being located between the surface of said opening in said housing and the surface of said movable member, whereby when said annular ring is compressed, it moves said other end of said seal more tightly against said one of said surfaces.

2. In combination, a housing having a wall defining an opening extending therein and a pair of spaced annular recesses formed on the inner surface thereof, a member arranged for movement in said opening, and a sealing assembly located between said movable member and the wall of said opening of said housing for sealing said opening so as to prevent leakage of a medium therethrough upon movement of said member, said assembly consisting of an annular resilient ring positioned in one of said recesses, and an annular semi-resilient elongated shaped seal having one end located adjacent and in engagement with said annular ring at its other end flanged for terminating and locking in the other recesses of said pair of recesses, with the point of pressure from said annular resilient ring being positioned at a point axially remote from said flanged end of said semi-resilient seal at said one end thereof, said seal being located between the surface of said opening in said housing and the surface of said movable member, whereby when said annular ring is compressed, it moves said one end of said seal tightly against said moving member.

3. In the combination as recited in claim 5, wherein the centerline of said annular resilient ring is substantially located at said one end of said semi-resilient seal.

4. In combination, a first housing having a wall defining an opening extending therein, a member arranged for movement in said opening, and a cartridge type sealing assembly located between said movable member and the wall of said opening of said housing for sealing said opening so as to prevent leakage of a medium therethrough upon movement of said member, said assembly consisting of a second housing having a pair of spaced annular recesses formed on the inner surface thereof, an annular resilient ring positioned in one of said recesses and arranged to be partially exposed to pressure of said medium, and an annular semi-resilient elongated shaped seal having one end located adjacent and in engagement with said annular ring and its other end flanged for terminating and locking in the other recess of said pair of recesses with the point of pressure from said annular resilient ring being positioned at a point axially remote from said flanged end of said semi-resilient seal, at said one end thereof, said seal being located between the surface of said opening in said second housing and the surface of said movable member, whereby when said annular ring is compressed, it urges said one end of said seal more tightly against said moving member.

5. In a piston assembly having a cylinder with an opening extending therein, a piston mounted for movement in said cylinder, a piston rod connected to said piston and arranged for movement in said opening in said cylinder, and a cartridge type sealing assembly located between said piston rod and the wall of said cylinder for sealing said opening so as to prevent leakage of a pressurized medium through said opening upon movement of said piston rod in said opening, said assembly consisting of a cylindrical housing having a pair of spaced annular recesses formed on the inner surface thereof substantially near the ends of said cylindrical housing, an annular resilient ring positioned in one of said recesses and arranged to be partially exposed to pressure of said medium, and an annular elongated shaped semi-resilient seal having one end located adjacent and in engagement with said annular ring and its other end flanged for terminating and locking in the other recess of said pair of recesses, with the point of pressure from said annular resilient ring being positioned at a point axially remote from said flanged end of said semi-resilient seal, at said one end thereof, said seal being located between the surface of said opening in said cylindrical housing and the surface of said piston rod, whereby when said annular ring is compressed, it moves said one end of said seal more tightly against said piston.

6. In combination, a first housing having a wall defining an opening extending therein, a member arranged for movement in said opening, and a cartridge type sealing assembly located between said movable member and the wall of said opening for sealing said opening so as to prevent leakage of a medium through said opening upon movement of said member in said opening, said assembly consisting of a second housing having a first pair of spaced annular recesses formed on the inner surface thereof substantially near the ends of said second housing and a second pair of annular recesses formed on the inner surface of said second housing and located intermediate of said first pair of annular recesses, an annular resilient ring positioned in each recess of said first pair of recesses and arranged to be partially exposed to pressure of said medium, and a pair of annular shaped semi-resilient seals, each seal having one end located adjacent and in engagement with one of said annular rings and its other end flanged for terminating and locking in one of the adjacent recesses of said second pair of recesses, with the point of pressure from the pressure exposed annular resilient ring being positioned at a point axially remote from the flanged end of its respective semi-resilient seal, at the respective one ends thereof, each said seal being located intermediate the surface of said opening in said second housing and the surface of said movable member but spaced from each other, whereby upon one of said partially exposed rings being subjected to pressure of said medium, said pressure exposed ring is compressed to, in turn, compress the opposite end of its respective seal in its respective recess and urge said seal more tightly against said moving member, with the other ring in said other recess of said first pair of recesses urging said other seal against said movable member so that said other seal acts as a scraper to remove impurities from the surface of said movable member and prevent their passage through said cartridge type sealing assembly.

7. A cartridge type sealing assembly located between a housing having an opening therein and a member arranged for movement in said opening for sealing said opening so as to prevent leakage of a medium through said opening upon movement of said member in said opening, said assembly consisting of a cylindrical housing having a pair of spaced annular recesses formed on the inner surface, an annular resilient ring positioned in one of said recesses and arranged to be partially exposed to pressure of said medium, and an annular cylindrical shaped semi-resilient seal having one end located adjacent and in engagement with said annular ring and its other end flanged for terminating and locking in the other recess of said pair of recesses, with the point of pressure from said annular resilient ring being positioned at a point axially remote from said flanged end of said semi-resilient seal, at said one end thereof, said seal being located between the surface of said opening in said cylindrical housing and the surface of said movable member, whereby upon said partially exposed annular ring being subjected to pressure of said medium, said annular ring is compressed to, in turn, compress the opposite end of said seal in its recess and urge said seal more tightly against said moving member.

8. A sealing assembly located between a housing having an opening therein and a member arranged for movement in said opening for sealing said opening so as to prevent leakage of a medium through said opening upon movement of said member in said opening, said assembly consisting of an annular resilient ring positioned in said housing and an annular semi-resilient elongated shaped seal having a flanged end for locking in said housing and its other end located adjacent and in engagement with said annular ring, with the point of pressure from said annular resilient ring being positioned at a point axially remote from said flanged end of said semi-resilient seal at said one end thereof, said seal being located between the surface of said opening in said housing and the surface of said movable member, whereby when said annular ring is compressed, it moves said other end of said seal more tightly against one of said surfaces.

9. A sealing assembly located between a housing having an opening therein and a member arranged for movement in said opening for sealing said opening so as to prevent leakage of a medium through said opening upon movement of said member in said opening, with said housing having a pair of spaced annular recesses formed on the inner surface of the wall defining said opening, said assembly consisting of an annular resilient ring positioned in one of said recesses and an annular semi-resilient elongated shaped seal having one end located adjacent and in engagement with said annular ring and its other end flanged for terminating and locking in the other recess of said pair of recesses, with the point of pressure from said annular resilient ring being positioned at a point axially remote from said flanged end of said semi-resilient seal at said one end thereof, said seal being located between the surface of said opening in said housing and the surface of said movable member, whereby when said annular ring is compressed, it moves said one end of said seal more tightly against said moving member.

References Cited in the file of this patent

UNITED STATES PATENTS

| | | |
|---|---|---|
| 1,855,897 | Taylor | Apr. 26, 1932 |
| 2,539,329 | Sanders | Jan. 23, 1951 |
| 2,772,900 | Campbell | Dec. 4, 1956 |
| 2,825,590 | Sutherland | Mar. 4, 1958 |
| 2,857,184 | Mancusi | Oct. 21, 1958 |
| 2,877,070 | Lee | Mar. 10, 1959 |
| 2,897,785 | Ortman | Aug. 4, 1959 |
| 2,909,398 | Taylor | Oct. 20, 1959 |
| 2,935,365 | Dega | May 3, 1960 |
| 3,057,630 | Snead | Oct. 9, 1962 |

OTHER REFERENCES

Product Engineering, September 1952, article entitled "Teflon," pages 149 through 153.

UNITED STATES PATENT OFFICE
CERTIFICATE OF CORRECTION

Patent No. 3,147,983 September 8, 1964

Milton C. Neuman et al.

It is hereby certified that error appears in the above numbered patent requiring correction and that the said Letters Patent should read as corrected below.

Column 3, line 35, for "recesses" read -- recess --; line 43, for the claim reference numeral "5" read -- 2 --.

Signed and sealed this 29th day of December 1964.

(SEAL)
Attest:

ERNEST W. SWIDER
Attesting Officer

EDWARD J. BRENNER
Commissioner of Patents